(12) United States Patent
Rashidi et al.

(10) Patent No.: US 11,320,455 B2
(45) Date of Patent: May 3, 2022

(54) SYSTEM AND METHOD FOR AUTONOMOUS SCANNING PROBE MICROSCOPY WITH IN-SITU TIP CONDITIONING

(71) Applicant: QUANTUM SILICON INC., Edmonton (CA)

(72) Inventors: Mohammad Rashidi, Edmonton (CA); Robert Wolkow, Edmonton (CA)

(73) Assignees: The Governors of the University of Alberta, Edmonton (CA); Quantum Silicon Inc., Edmonton (CA)

( * ) Notice: Subject to any disclaimer, the term of this patent is extended or adjusted under 35 U.S.C. 154(b) by 0 days.

(21) Appl. No.: 16/981,512

(22) PCT Filed: Mar. 19, 2019

(86) PCT No.: PCT/CA2019/050333
§ 371 (c)(1),
(2) Date: Sep. 16, 2020

(87) PCT Pub. No.: WO2019/178681
PCT Pub. Date: Sep. 26, 2019

(65) Prior Publication Data
US 2021/0373045 A1 Dec. 2, 2021

Related U.S. Application Data

(60) Provisional application No. 62/644,974, filed on Mar. 19, 2018.

(51) Int. Cl.
*G01Q 30/06* (2010.01)
*G01Q 80/00* (2010.01)
*G06N 3/08* (2006.01)

(52) U.S. Cl.
CPC ............ *G01Q 30/06* (2013.01); *G01Q 80/00* (2013.01); *G06N 3/08* (2013.01)

(58) Field of Classification Search
CPC ........ G01Q 30/00; G01Q 30/04; G01Q 30/06; G01Q 40/00; G01Q 80/00; G01Q 70/08
See application file for complete search history.

(56) References Cited

U.S. PATENT DOCUMENTS

2020/0141972 A1* 5/2020 Kornilov ................ G01Q 30/02

FOREIGN PATENT DOCUMENTS

WO 2018015809 A2 1/2018

OTHER PUBLICATIONS

Straton et al, "Removal of Multiple-tip Artifacts from Scanning Tunneling Microscope Images by Crystallographic Averaging", Advances Structural and Chemical Imaging, 2015, 1:14 (Year: 2015).*

(Continued)

*Primary Examiner* — David E Smith
(74) *Attorney, Agent, or Firm* — Blue Filament Law PLLC

(57) ABSTRACT

A method for assessing the quality of a tip of a scanning probe microscope (SPM) includes recording an SPM image, extracting a plurality of images of dangling bonds from the SPM image, feeding the extracted images of dangling bonds into a convolution neural network one image at a time, analyzing each of the plurality of images of dangling bonds using the convolution neural network, assigning each of the plurality of images of dangling bonds one of a sharp tip status or a double tip status, and determining whether the number of the plurality of images of dangling bonds of the SPM image assigned the double tip status exceeds a predetermined threshold. A method of automatically conditioning a tip of a scanning probe microscope (SPM) during imaging (Continued)

of a sample and a method of mass-producing atomistic quantum dots, qubits, or particular atom orbital occupation are also provided.

14 Claims, 23 Drawing Sheets

(56) References Cited

OTHER PUBLICATIONS

Int'l. Search Report for PCT/CA2019/050333, dated Jun. 11, 2019.
Rashid I et al. "Autonomous Scanning Probe Microscopy in-situ Tip Conditioning through Machine Learning". ACS Nano 2018, 12, 6, pp. 5185-5189, Mar. 23, 2018.
Straton et al. "Removal of multiple-tip artifacts from scanning tunneling microscope images by crystallographic averaging". Advanced Structural and Chemical Imaging 2015 1:14, pp. 1-12.
Wang et al. "Double-Tip Artifact Removal From Atomic Force Microscopy Images", IEEE Transactions on Image Processing, vol. 25, No. 6, Jun. 2016, pp. 2774-2788.

* cited by examiner

|  | precision | recall | f1-score | support |
|---|---|---|---|---|
| 0.0 | 0.89 | 0.89 | 0.89 | 234 |
| 1.0 | 0.87 | 0.87 | 0.87 | 206 |
| avg / total | 0.88 | 0.88 | 0.88 | 440 |

```
Confusion matrix:
[[208  26]
 [ 26 180]]
Accuracy=0.8818181818181818
```

FIG. 6

|  | precision | recall | f1-score | support |
|---|---|---|---|---|
| 0.0 | 0.89 | 0.89 | 0.89 | 234 |
| 1.0 | 0.88 | 0.88 | 0.88 | 206 |
| avg / total | 0.89 | 0.89 | 0.89 | 440 |

```
Confusion matrix:
[[209  25]
 [ 25 181]]
Accuracy=0.8863636363636364
```

FIG. 7

|  | precision | recall | f1-score | support |
|---|---|---|---|---|
| 0.0 | 0.78 | 0.82 | 0.80 | 234 |
| 1.0 | 0.79 | 0.73 | 0.76 | 206 |
| avg / total | 0.78 | 0.78 | 0.78 | 440 |

```
Confusion matrix:
[[193  41]
 [ 56 150]]
Accuracy=0.7795454545454545
```

FIG. 11

K Nearest Neighbors Results

|   | precision | recall | f1-score | support |
|---|---|---|---|---|
| 0.0 | 0.79 | 0.93 | 0.86 | 234 |
| 1.0 | 0.90 | 0.72 | 0.80 | 206 |
| avg / total | 0.84 | 0.83 | 0.83 | 440 |

```
Confusion matrix:
[[218  16]
 [ 57 149]]
Accuracy=0.8340909090909091
```

FIG. 12

FIG. 13A
FIG. 13D
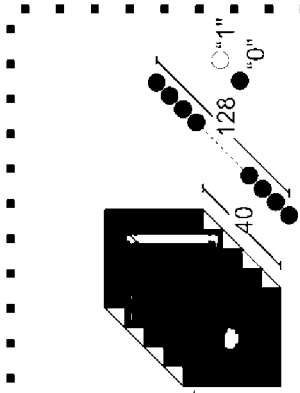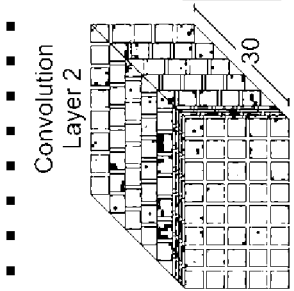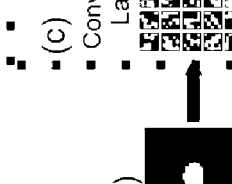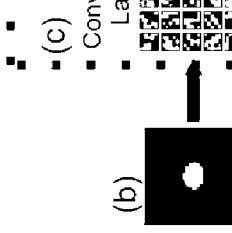
FIG. 13B
FIG. 13C

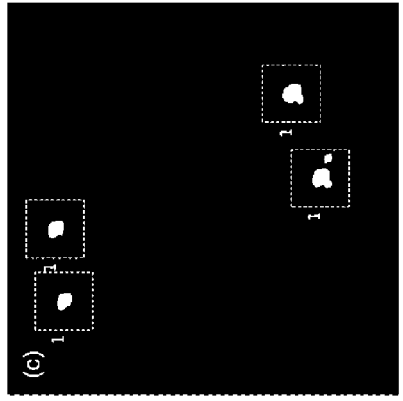
FIG. 21C
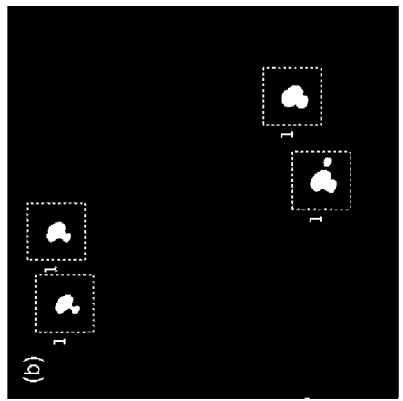
FIG. 21B
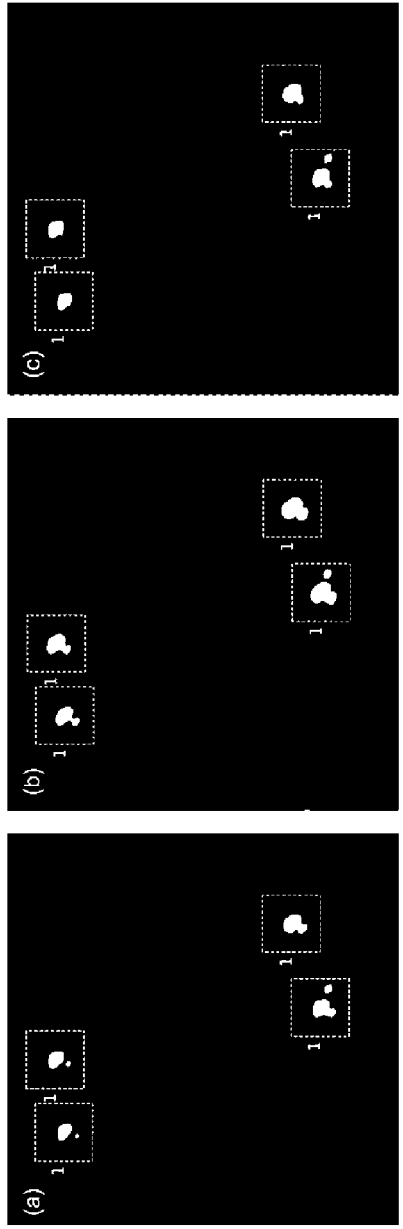
FIG. 21A
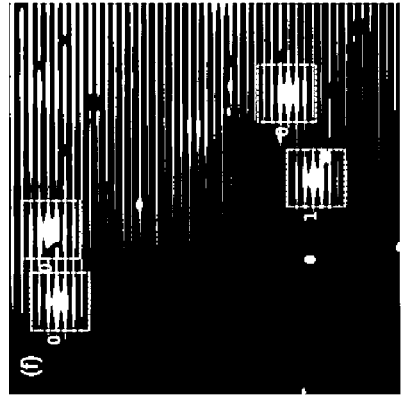
FIG. 21F
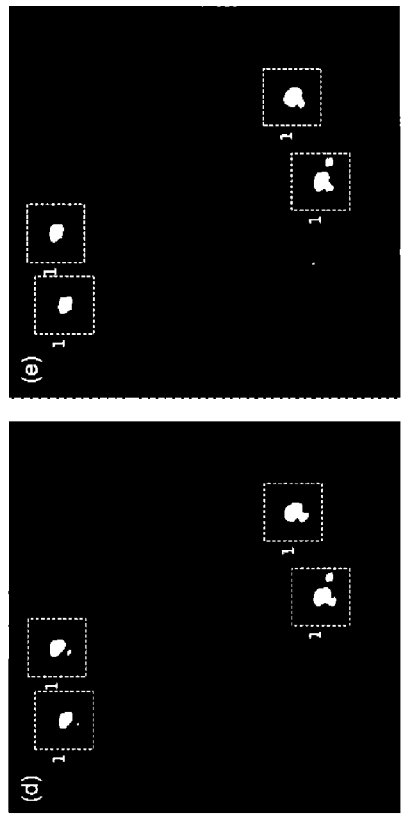
FIG. 21E
FIG. 21D

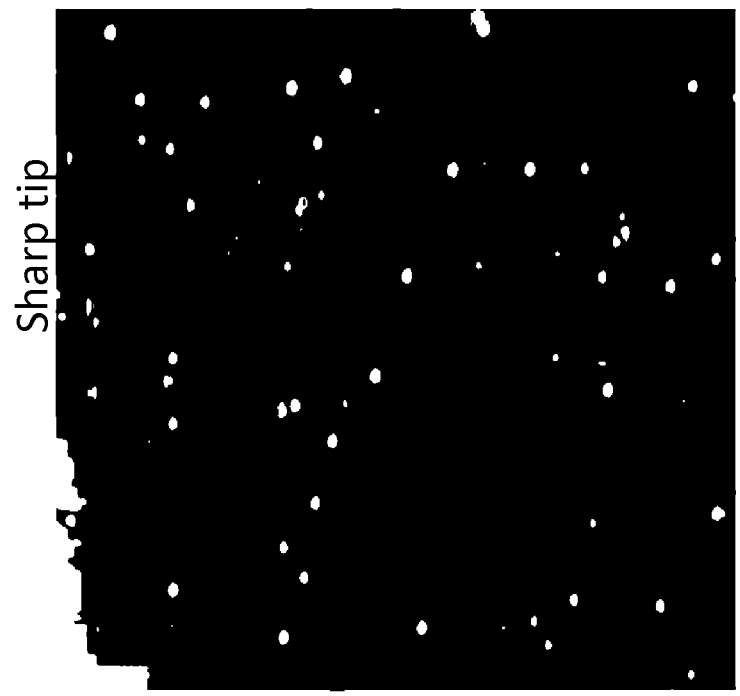
FIG. 22B Sharp tip
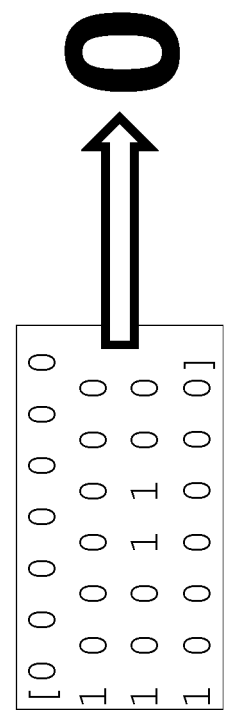
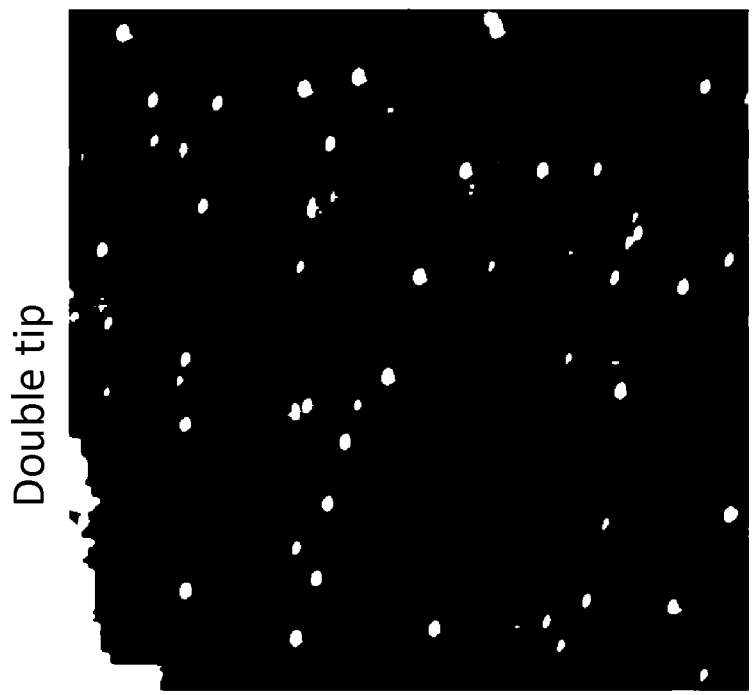
FIG. 22A Double tip

SYSTEM AND METHOD FOR AUTONOMOUS SCANNING PROBE MICROSCOPY WITH IN-SITU TIP CONDITIONING

RELATED APPLICATIONS

This application claims priority benefit of U.S. Provisional Application Ser. No. 62/644,974; filed 19 Mar. 2018; the contents of which are hereby incorporated by reference.

FIELD OF THE INVENTION

The present invention is directed generally to scanning probe microscopes (SPMs), and more specifically to scanning probe microscopes designed to use machine learning technology to predict failure of a probe tip and to automatically re-functionalize or condition the probe tip in-situ.

BACKGROUND

Scanning probe microscopes (SPMs) are a family of tools used to make images of nanoscale surfaces and structures, including atoms. They use a physical probe to scan back and forth over the surface of a sample. During this scanning process, a computer gathers data that is used to generate an image of the surface.

As shown in FIG. 1, an SPM has a probe tip that can be as sharp as a single atom. The tip is moved precisely and accurately back and forth across the surface, even atom by atom. When the tip is near the sample surface, SPMs can measure tip-surface interactions caused by many kinds of effects, including tunneling current, electrostatic forces, magnetic forces, chemical bonding, van der Waals forces, and capillary forces. SPMs can detect differences in height that are a fraction of a nanometer, about the diameter of a single atom. A computer combines the data to create an image.

There are several types of SPMs. Atomic force microscopes (AFMs) measure the electrostatic forces between the cantilever tip and the sample. Magnetic force microscopes (MFMs) measure magnetic forces. And scanning tunneling microscopes (STMs) measure the tunneling current flowing between the tip and the sample.

In addition to visualizing nanoscale structures, SPMs are used to manipulate individual atoms and molecules and move them to make specific patterns. For example, SPMs can be used to add or remove hydrogen atoms from a silicon surface to manipulate multiple dangling bonds (DBs) on an otherwise H-terminated silicon surface that form quantum dots. A DB corresponds to a desorbed single hydrogen atom from the otherwise passivated silicon surface. It is approximately an sp3 hybrid orbital that can be occupied by 2, 1, or 0 electrons resulting, respectively, in a negative, neutral, or positively charged DB. Thus, a DB behaves essentially as a single atom quantum dot. controlled atom-by-atom lithography, i.e. hydrogen desorption, on the H—Si surface allows creation of DB based circuits for next generation ultimately miniaturized low power nanoelectronic devices beyond complementary metal oxide semiconductor (CMOS) technology. In principle, the capacity of this technology provides smaller, more efficient, faster and cheaper electronics compared to the currently dominant CMOS technology.

Hydrogen-terminated silicon surfaces are a promising platform for atomic circuitry. This is due, among other things, to its inertness, thermal stability, very low defect density, and particularly the unique properties of its surface dangling bonds. Fundamental properties of isolated dangling bonds have been studied extensively. It has been shown that they are electronically isolated from the host substrate and can hold charge, thereby acting as atomic quantum dots. They can be precisely placed and erased. Various functional elements such as quantum-cellular-automaton cells, binary transmission wires, and binary computational gates can be made by arranging dangling bonds close to each other.

SPM techniques and in particular atomic manipulation rely on atomically sharp tips. The tip preparation is done in different steps. First, a metal wire, commonly tungsten, is electrochemically etched in ambient condition, resulting in few tens of nanometer large tips. This step is usually followed by thermal annealing in ultra-high vacuum to clean the oxide layer formed at the apex of the tip during the etching process. The tip can be additionally sharpened down to the single atom via field ion microscopy. The carefully ex-situ prepared atomically sharp tips occasionally become non-ideal or fail (generally called "double tips") during imaging and atomic manipulation due to the interaction with the surface. SPM data collected with a failed tip is generally unreliable and unusable. In-situ tip treatments are necessary to return the tip to its ideal (sharp) condition. In-situ tip sharpening can be performed but is usually the most time-consuming process for SPM operators. It is often done by applying voltage pulses between the tip and the sample or by a controlled indentation of the tip into the sample. This process most often needs to be repeated several times before obtaining the desired tip again.

Accordingly, current SPM techniques are too slow to be practical. Therefore, there exists a need for a rapid and commercially feasible way to mass produce electronic components with atomic precession.

SUMMARY

A method for assessing the quality of a tip of a scanning probe microscope (SPM) is provided. The method includes recording an SPM image, extracting a plurality of images of dangling bonds from the SPM image, feeding the extracted images of dangling bonds into a convolution neural network one image at a time, analyzing each of the plurality of images of dangling bonds using the convolution neural network, assigning each of the plurality of images of dangling bonds one of a sharp tip status or a double tip status, and determining whether the number of the plurality of images of dangling bonds of the SPM image assigned the double tip status exceeds a predetermined threshold.

A method of automatically conditioning a tip of a scanning probe microscope (SPM) during imaging of a sample is also provided. The method of automatically conditioning a tip includes setting an image frame and a location for tip conditioning, performing the method for assessing the quality of a tip, as described above, within the image frame on the sample, conditioning the tip when it is determined that the number of the plurality of images of dangling bonds of the SPM image within the image frame assigned the double tip status exceeds the predetermined threshold.

A method of mass producing atomistic quantum dots, qubits, or particular atom orbital occupation is also provided that includes selectively sensing or modifying the orbital occupation state of a given atom with an SPM, repeating the selectively sensing or modifying the orbital occupation state of a plurality of additional individual atoms with the SPM, performing a method of assessing the quality of a tip of a scanning probe microscope (SPM) and/or conditioning the tip of a SPM, repairing the SPM or replacing the SPM with a new SPM, and repeating the selectively sensing or modifying the orbital occupation state of a second plurality of additional individual atoms with the repaired SPM or the new SPM.

BRIEF DESCRIPTION OF THE DRAWINGS

FIG. 6 is a table showing the best parameters determined from the graph of FIG. 5;

FIG. 7 is a table showing the best parameters determined from the random forest;

FIG. 11 is a table showing the determined best depth of the FCNN based on the results of the train and test data;

FIG. 12 is a table showing the nearest neighbor result;

FIGS. 13A-13D show the workflow of a tip quality analysis process using a CNN according to an embodiment of the present disclosure;

FIGS. 21A-21F show a sequence of SPM images during an autonomous tip reconditioning process according to an embodiment of the present disclosure;

FIGS. 22A and 22B show the outcome of dangling bond image analysis by the CNN of a conditioned tip having a sharp status compared to a double bond tip SPM image, respectively;

DESCRIPTION OF THE INVENTION

Figure 1:
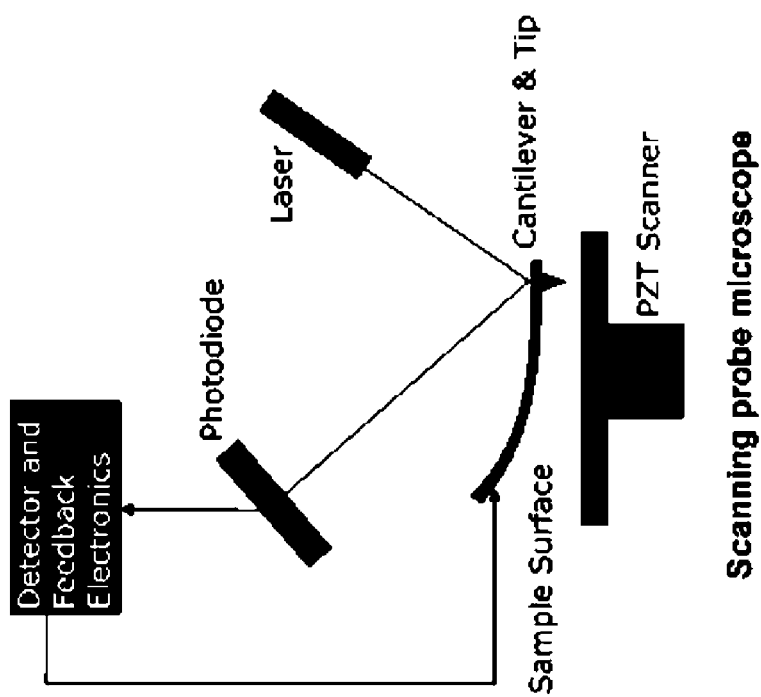
FIG. 1 shows a prior art schematic drawing of the components of a scanning probe microscope.

The present invention has utility as a system and method for autonomous scanning probe microscopy with an automated process for determining the condition of the tip and in-situ tip conditioning for a probe tip when it is determined that the probe tip has failed or is no longer optimal. The present invention provides scanning probe microscopes designed to use machine learning technology to predict failure of a probe tip and to automatically re-functionalize or recondition the probe tip in-situ thereby reducing the need for user intervention and failed experiments or failed scans due to failed probe tips. The present invention provides the ability to automate a vast number of atomic precision robots to manipulate and analyze atoms in parallel with limited human intervention.

The present invention has utility in the automated production of atomistic quantum dots, qubits, or selective bonding to a dangling bond (unoccupied orbital extending from a surface atom). Such structures have been detailed for example in PCT/IB2006/000510 and PCT/IB2009/006400, the contents of which are hereby incorporated by reference. Besides facilitating mass production, or operation of the quantum computing elements, it is appreciated that a given atomic orbital functions as a binary storage element as unoccupied or occupied. As a result of a given atom functioning as an atomic scale transistor operative for data storage. With reliable modification or sensing of orbital occupation, large scale atomic computation and data storage becomes practical, as compared to the current labor intensive processes.

While the present disclosure describes automated SPM atomic manipulation and tip re-conditioning in the context of hydrogen-terminated silicon surfaces, it will be readily understood that the system and methods described herein are not limited to such hydrogen-terminated silicon substrates and can be adapted for other systems as well.

The present disclosure provides a system and automated method for detecting the condition of a probe tip of an SPM device and changes in the condition. The system and method can detect conditions such as the sharpness of the probe tip and other qualities contributing to SPM image quality like chemical, magnetic, or optical qualities. Upon detecting loss or decrease of a desired quality such as sharpness (commonly called a "double tip") the automated system and method of the present disclosure reconditions the probe tip, for example by sharpening the tip by some objective criteria, or by re-establishing magnetic, chemical, or optical quality. Embodiments of the system and method for automated probe tip condition detection provide for the automated detection of the condition of the probe tip during operation of the SPM device, that is while the probe tip is scanning or atomically manipulating the surface of a given sample, the condition of the probe tip is monitored for degradation. Upon detection of a degraded probe tip condition, the operation of the SPM device is paused and the probe tip is automatically reconditioned without human intervention. The system and method also provide an automated awareness or detection of when reconditioning of the probe tip is achieved, thereupon the operation of the SPM device resumes with the probe tip continuing its scanning or atomic manipulation operation from the location at which the operation was paused.

Figure 2:
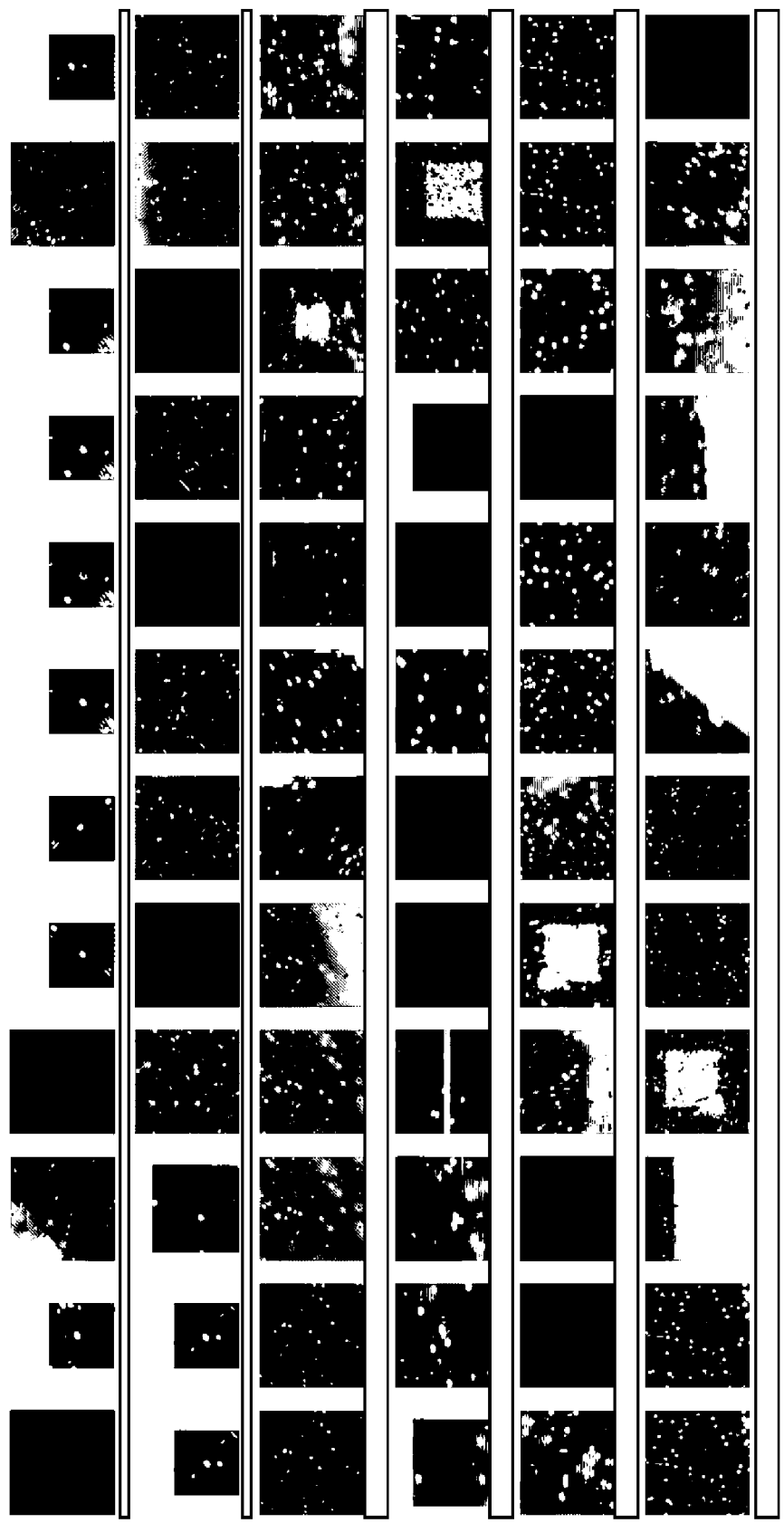
FIG. 2 shows a compilation of SPM images recorded under similar conditions and used for training the tested machine learning models.
Figure 3B:
FIGS. 3A and 3B show two SPM images of FIG. 2 labeled as a good tip and a double tip, respectively.
Figure 3A:
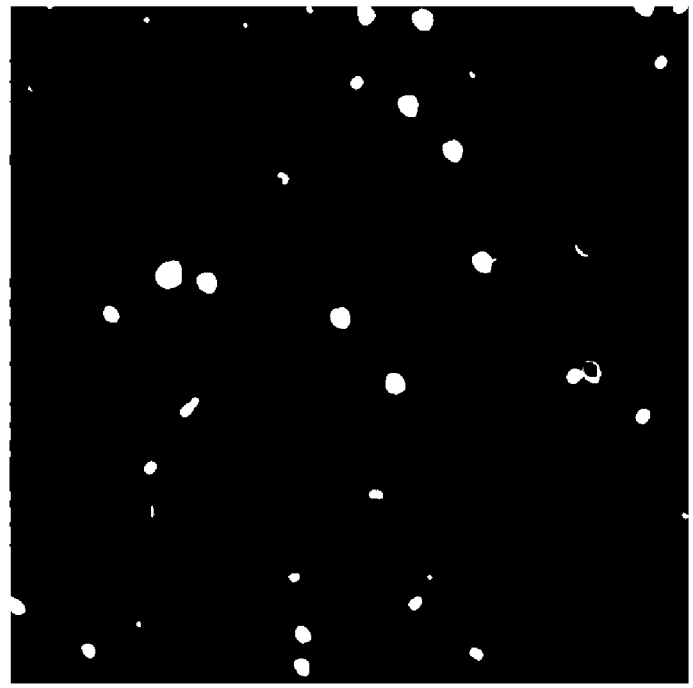
Figure 4:
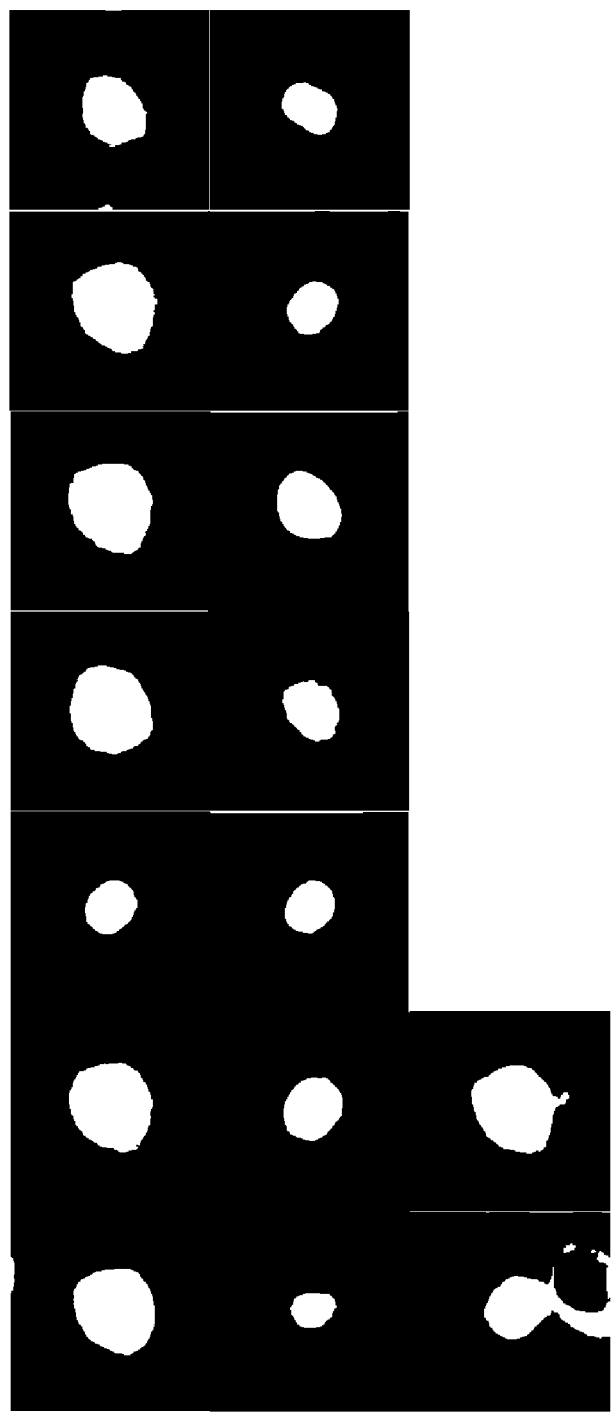
FIG. 4 shows images of dangling bonds extracted from an SPM image of FIG. 2.
Figure 5:
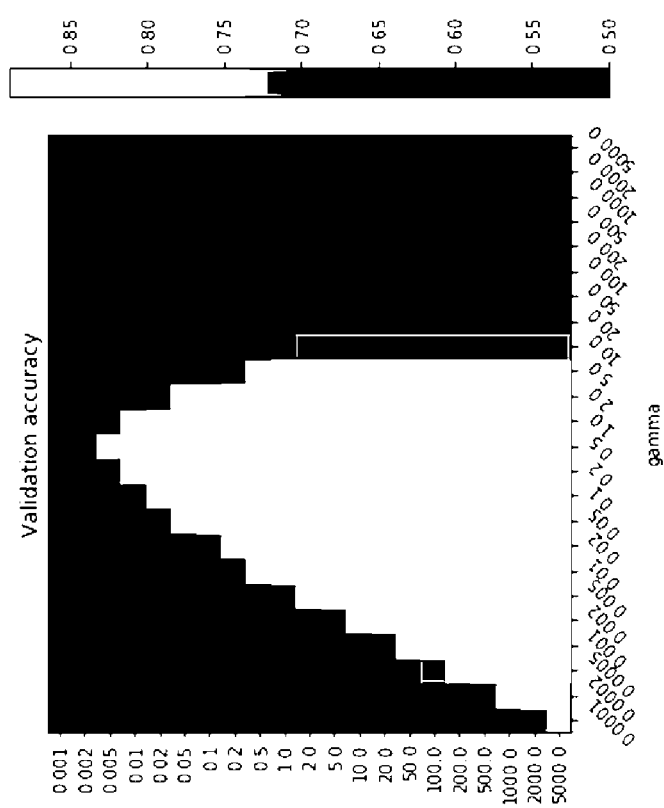
FIG. 5 is a graph of the result of the grid search for support vector machine.
Figure 8:
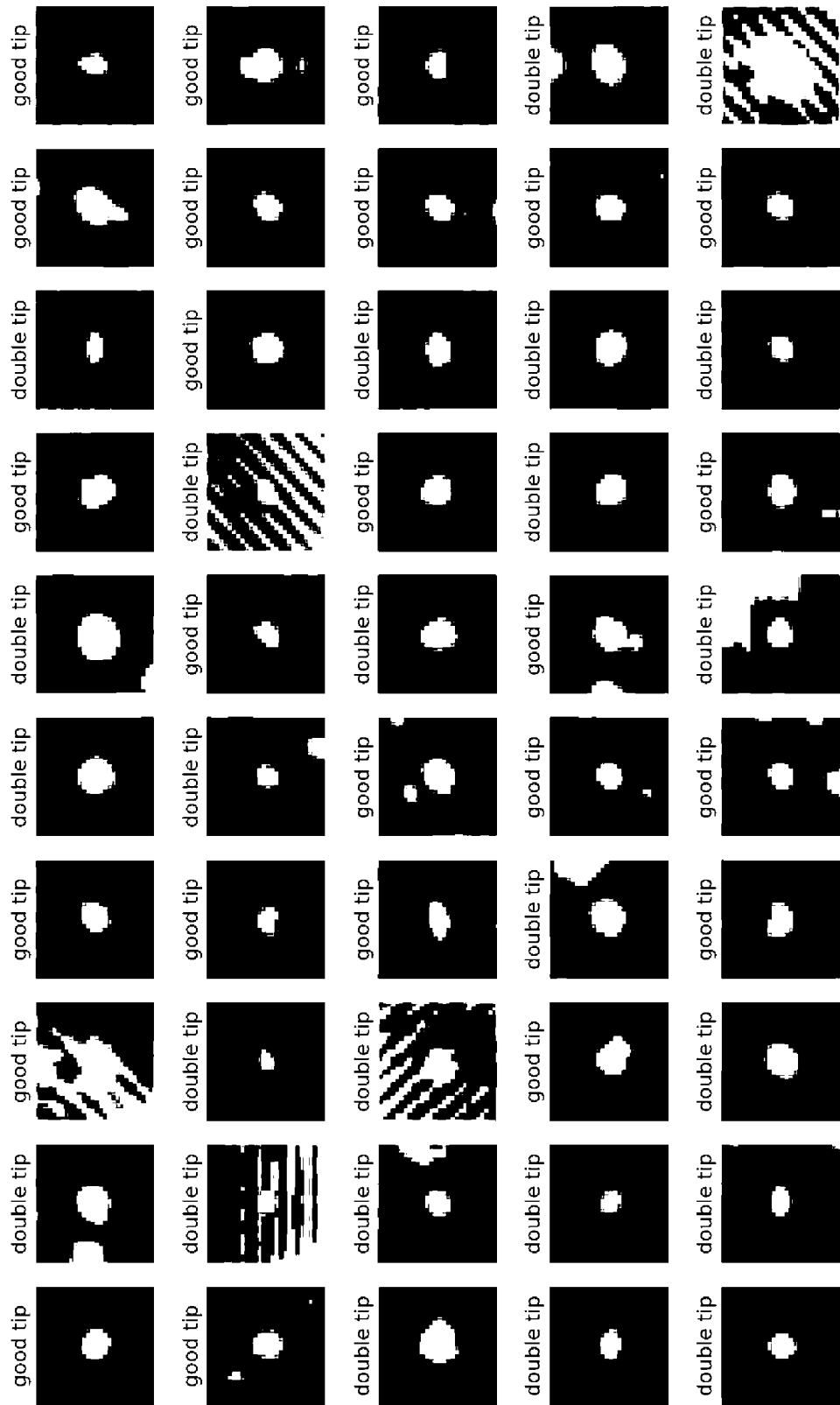
FIG. 8 shows a collection of misclassified dangling bond images of the random forest of FIG. 7.
Figure 9:
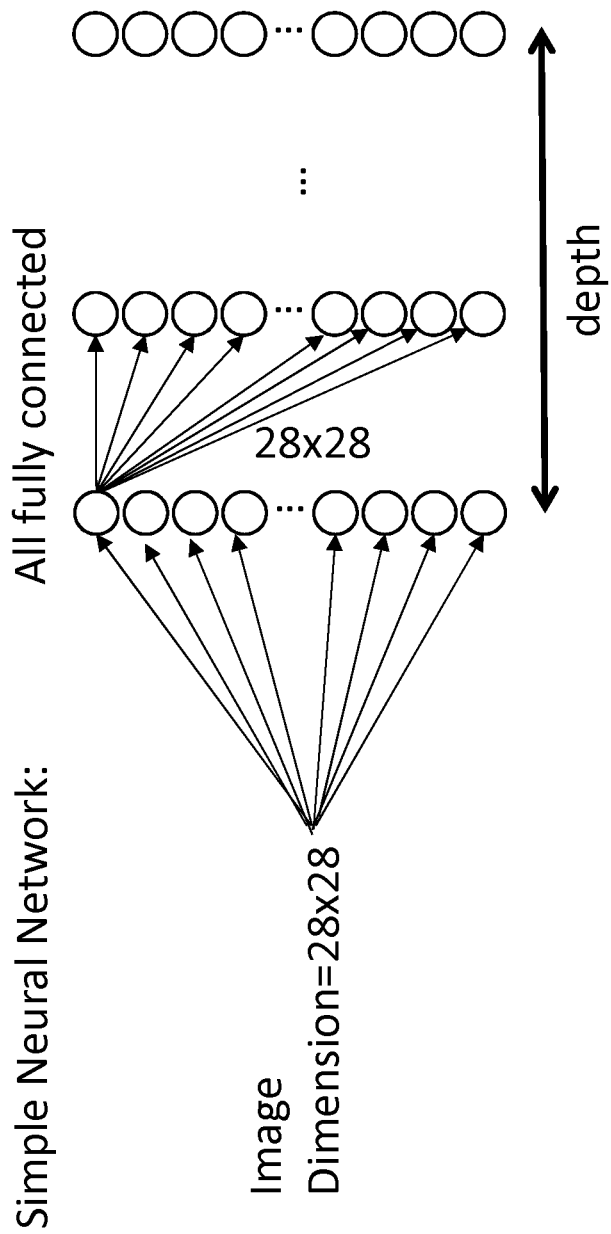
FIG. 9 is a schematic representation of a fully connected neural network.
Figure 10:
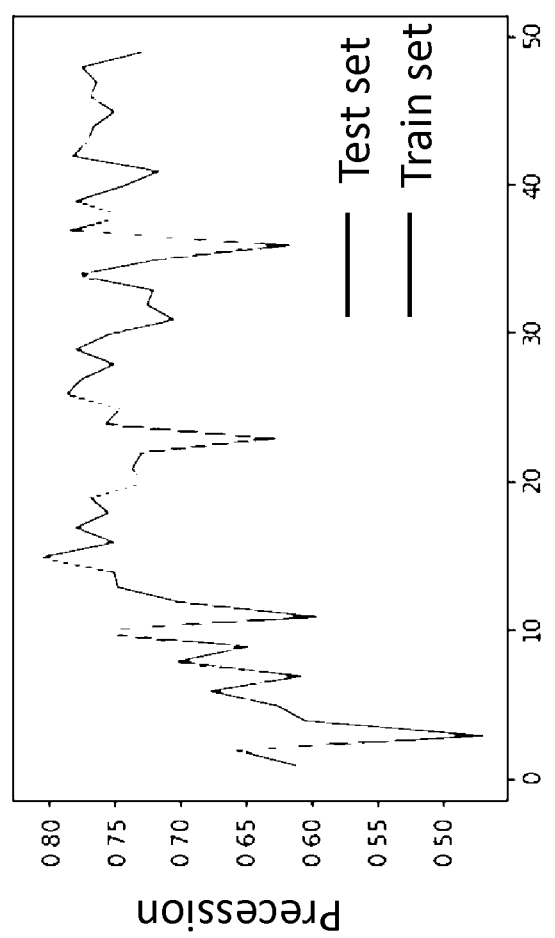
FIG. 10 is a graph showing the accuracy score of the fully connected neural network (FCNN) in FIG. 9 for different number of hidden layers.

The inventive system and methods of the present disclosure implement machine learning algorithms to monitor and assess probe tip condition and determine when tip reconditioning is required. The automation process is trained using machine learning. A convolution neural network (CNN) model is used in the training. The CNN includes two hidden layers. As shown in FIG. 2, the first step of the training process includes compiling a number of SPM images recorded under similar conditions, for example those images recorded under conditions of −1.8V and greater than 10×10 nm. Next, as shown in FIGS. 3A and 3B, each of the extracted SPM images are labeled as being a good tip scan or an undesirable degraded tip scan, for example a double tip. Next, from the extracted and labeled SPM images, images of the dangling bonds are further extracted. The dangling bonds appear in the SPM images as bright protrusions, such as those shown in FIG. 4. Next, the images of the dangling bonds are split into a train set and a test set. The images of the dangling bonds in the train set are augmented by rotating the images four times by 90° and then mirrored each image, such that the images in the train set are multiplied by eight times. Next, the images of the dangling bonds in the train set are input into the CNN one at a time such that the CNN learns to recognize a good tip image and a double tip image. FIG. 9 shows a fully connected neural network such as the one used herein. Next, the test set of dangling bond images are used to test the training of the CNN machine learning. The most time consuming part of the training is to establish the best parameters to fit the data and to get the best performance on the test set. This is done by grid search and cross validation. The result of the grid search for two support vector machine (SVM) parameters is shown in FIG. 5. FIG. 6 shows the result of the best parameters. FIG. 7 shows the parameters established from the random forest. Upon completion of the training, the machine learning algorithm of the CNN obtains a precision score of 97%. FIG. 9. is a graph showing a fully connected neural network. As shown in FIG. 10, the best depth based on the comparison of the train and test data is at a depth of 18.

FIGS. 13A-13D show a workflow of the tip quality analysis using a CNN. During a SPM scanning or atomic manipulation operation, the inventive method records and SPM images of a sample surface as shown in FIG. 13A. The surface in FIG. 13A is a hydrogen-terminated Si(100) recorded at −1.8 V and 50 pA. According to various embodiments, the SPM image recorded is 100×100 nm². Dangling bonds on the surface are shown as bright features. Here the bright features have been segmented from the SPM image as shown by the dotted line boxes shown in FIG. 13A. The method continues with the images of the dangling bonds of FIG. 13A being automatically extracted and fed into the CNN one at a time. FIG. 13B shows one of the images of the dangling bonds from the recorded SPM image shown in FIG. 13A. According to some embodiments each of the images of dangling bonds are 6×6 nm².

Figure 14:
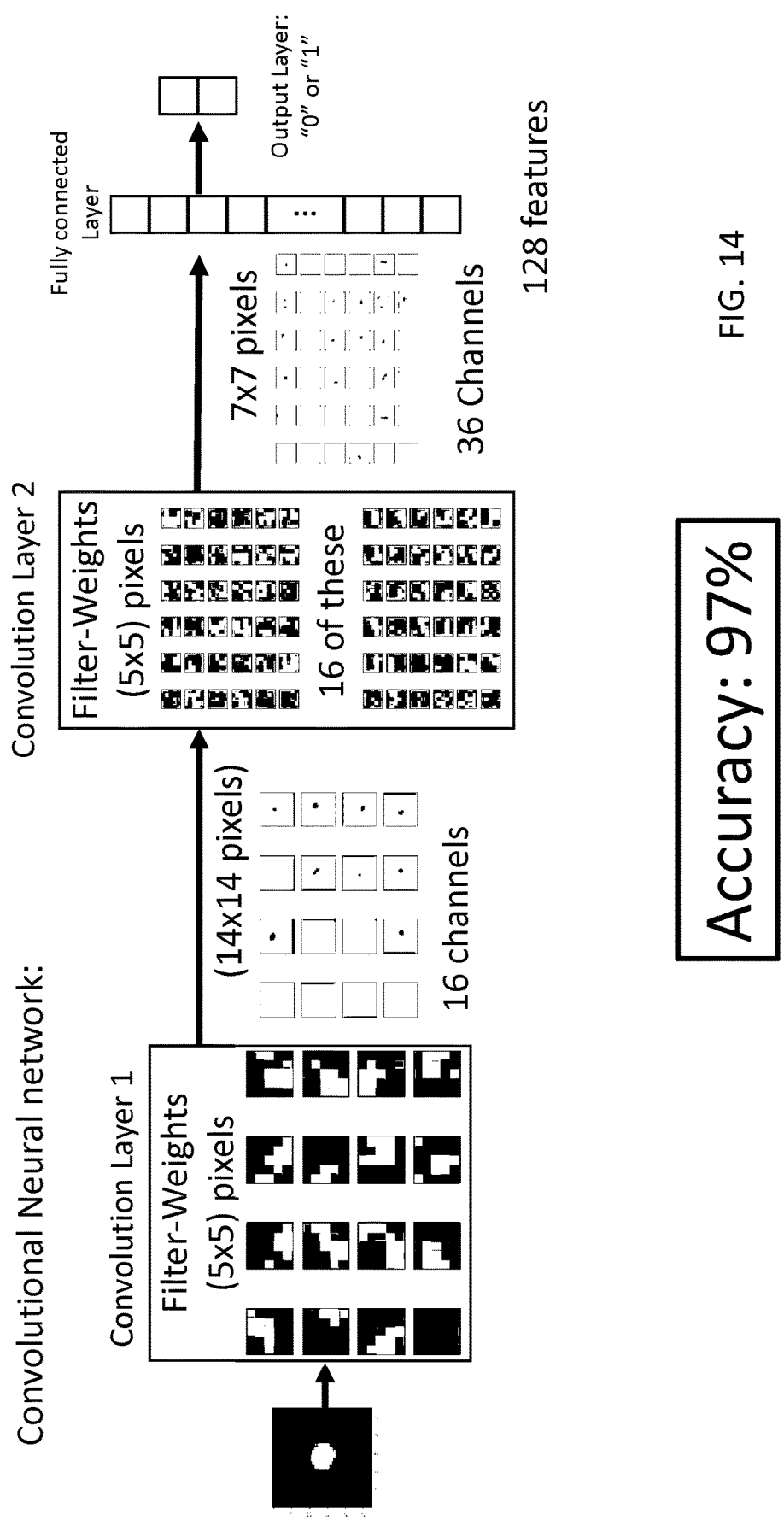
FIG. 14 shows a CNN according to an embodiment of the present disclosure.
Figure 15:
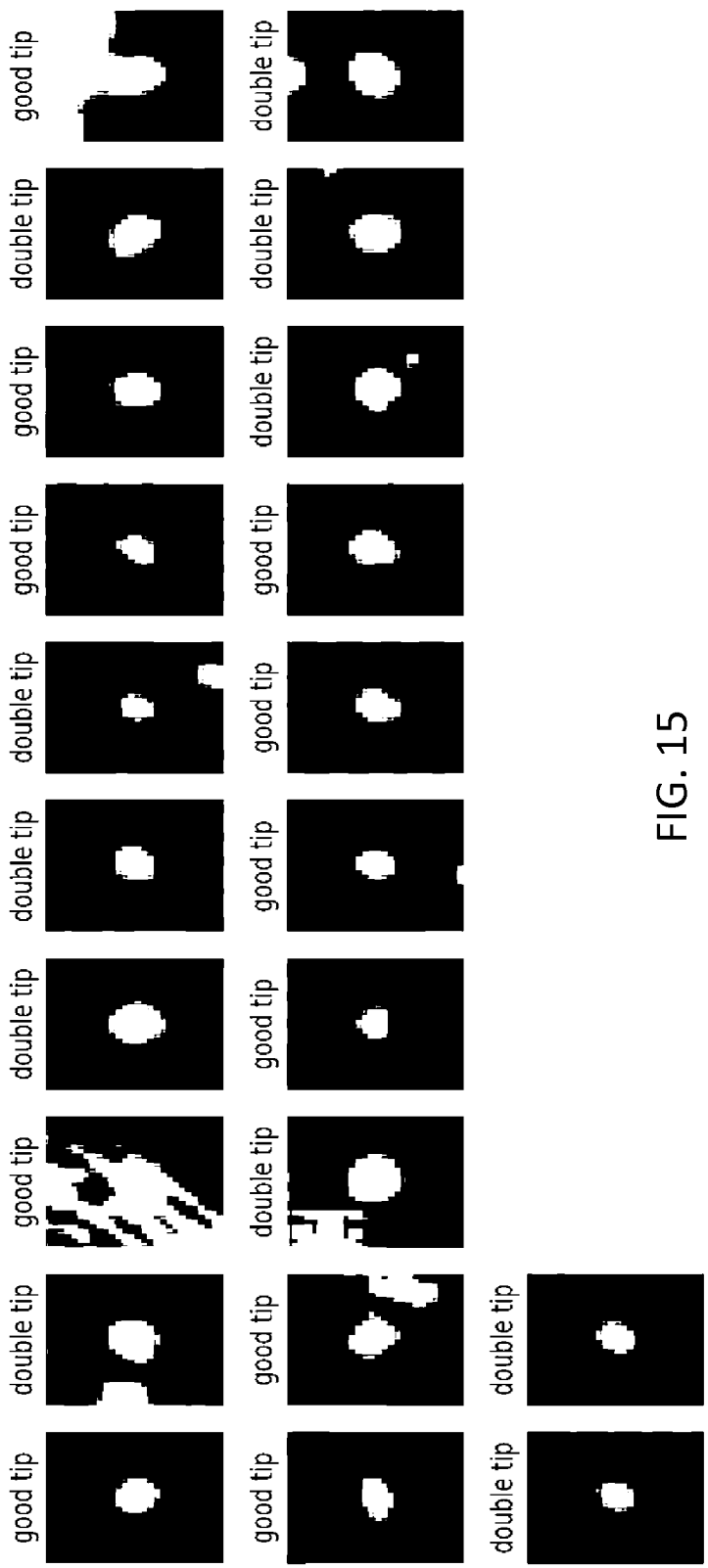
FIG. 15 shows a compilation of dangling bond images misclassified by the CNN of FIG. 14.
Figure 16:
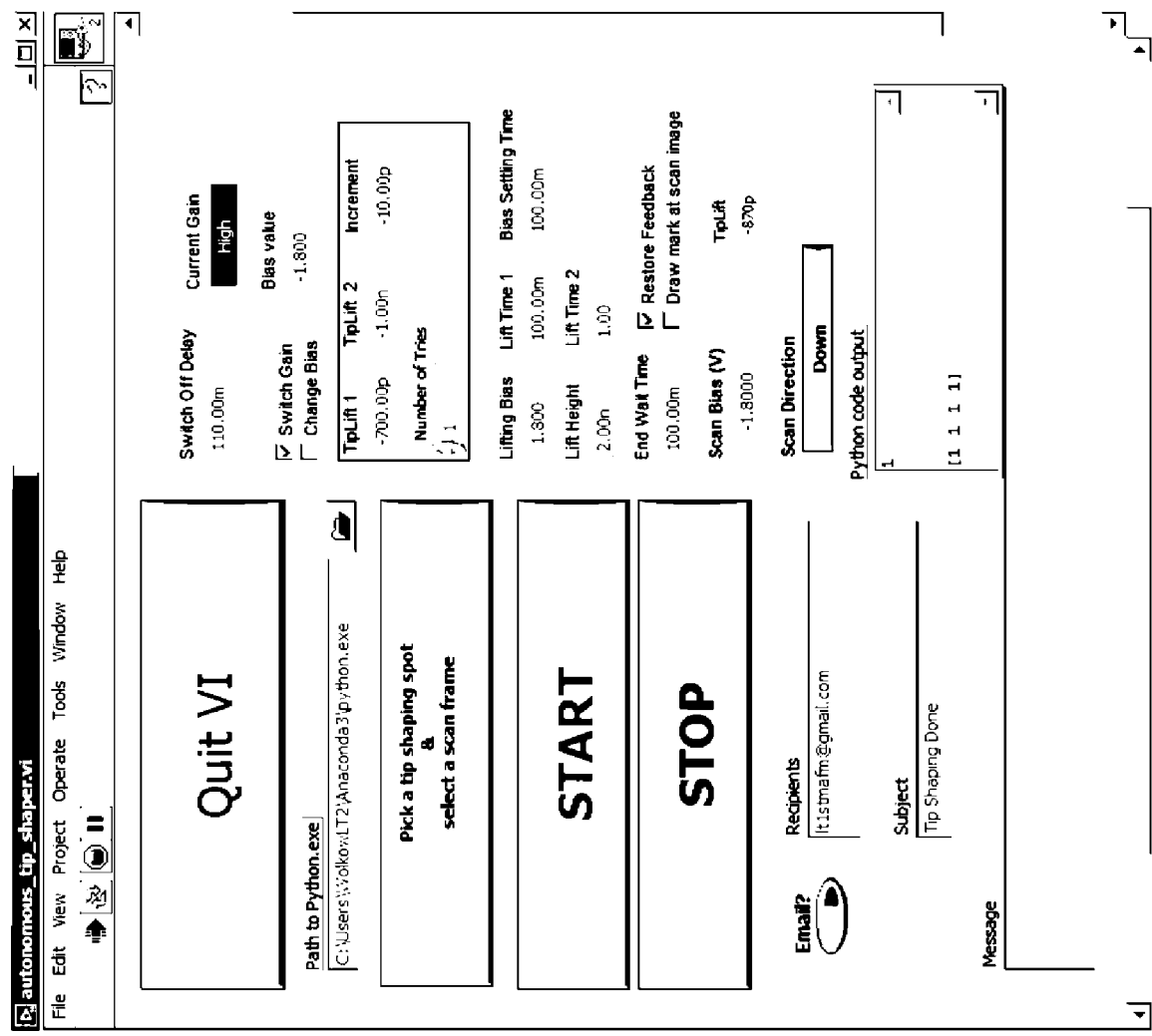
FIG. 16 shows a user interface for automating SPM tip conditioning according to an embodiment of the present disclosure.

Each of the extracted images of dangling bonds is fed into the CNN, which is shown at FIG. 13C. The CNN includes two convolution layers followed by a pooling layer, a densely connected layer, and an output layer. As indicated in FIG. 13C, the two convolutional layers of the CNN have 30 and 40 kernels, respectively. The CNN uses its machine learning training to analyze the images of the dangling bonds for characteristics indicative of the tip quality. Further details of the CNN processing of a dangling bond image are shown in FIG. 14. The CNN pixilates the dangling bond image to examine each dangling bond image for characteristics indicative of a good tip or a double tip. For each image of a dangling bond, the CNN makes a determination of a sharp tip or a double tip. For sharp tips, the output layer of the CNN assigns a dangling bond image the number "0." For double tips, the output layer of the CNN assigns a dangling bond image the number "1." FIG. 13D displays the output of the CNN for all the dangling bonds in the SPM image of FIG. 13A. The method then continues by determining how many dangling bond images of the SPM image have been assigned the double tip, "1" status, for example by performing a majority voting operation. Implementing the majority voting operation increases the operational accuracy of the CNN to nearly 100%. When the number of dangling bond images of the SPM image that have been assigned the double tip, "1" status exceeds a predetermined threshold, a user may be altered by a light or a sound on the SPM device and/or an automatic tip reconditioning process is undertaken.

Figure 17:
FIG. 17 shows an image frame and location for tip conditioning selected by a user.
Figure 18:
FIG. 18 shows a SPM image recorded within the image frame of FIG. 17 with the dangling bonds that selected by the automation routine (identified in dashed line boxes)
Figure 19:
FIG. 19 shows the identified dangling bonds with double tip statuses assigned by the CNN.

The present disclosure further provides a method of automatically conditioning a tip of a scanning probe microscope (SPM) during imaging of a sample. The method beings with a user setting an image frame and a location for tip conditioning, such as that shown in FIG. 17. The location of tip conditioning is a location on the sample outside of the image frame. In FIG. 17, the image frame is shown within the dashed line, and the location of tip conditioning is shown by the "X." The method continues by imaging the sample within the image frame using SPM and performing the above described method for assessing the quality of a tip of a scanning probe microscope within the selected image frame on the sample. As described above, images of the dangling bonds are extracted, as shown in FIG. 18, and the CNN assess quality of the tip based on characteristics of the dangling bond images. The CNN assigns a good tip status of "0" or a double tip status of "1" to each dangling bond image, as shown in FIG. 19. The CNN then does a voting operation to determine if the probe tip is sharp or double. Depending on the outcome of this assessment, the program either stops operation (for sharp tips) or repeats the same procedure (for double tips). The tip assessment is repeated within the image frame on the sample until it is determined that the number of images of dangling bonds of the SPM image within the image frame assigned the double tip status exceeds the predetermined threshold, such as the CNN output shown in FIG. 20.

Figure 20:
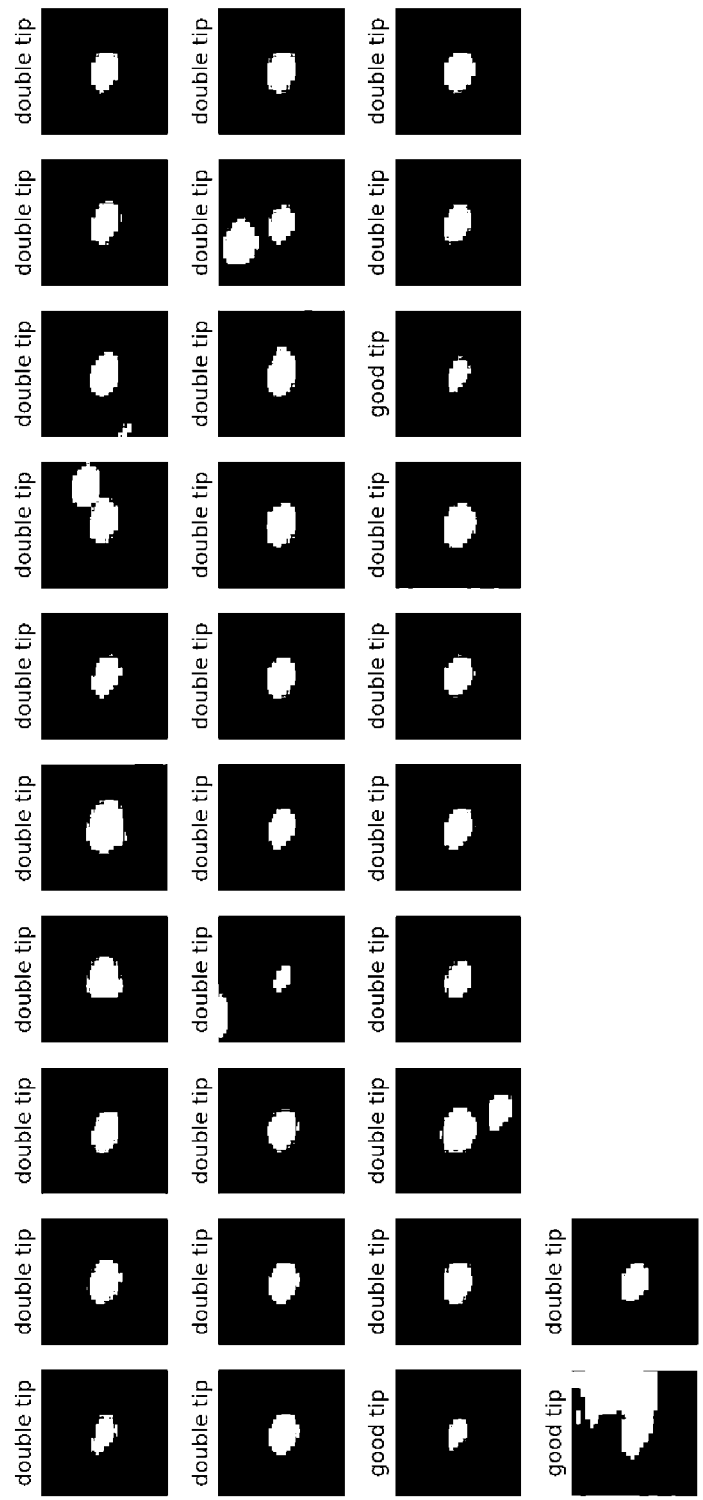
FIG. 20 shows the outcome of image analysis by the CNN in which it is determined the tip is a double tip.
Figure 23C:
FIGS. 23A-23E show a sequence of SPM images captured and analyzes by the CNN during an automated tip conditioning process according to an embodiment of the present disclosure.
Figure 23B:
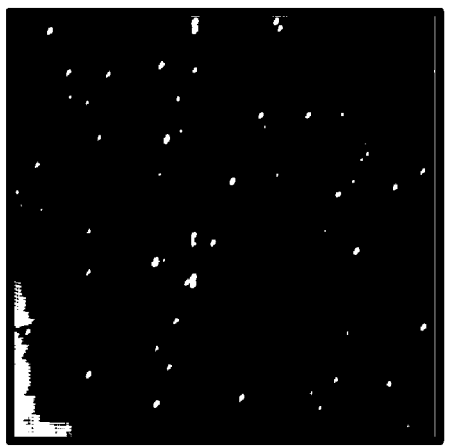
Figure 23A:
Figure 23E:
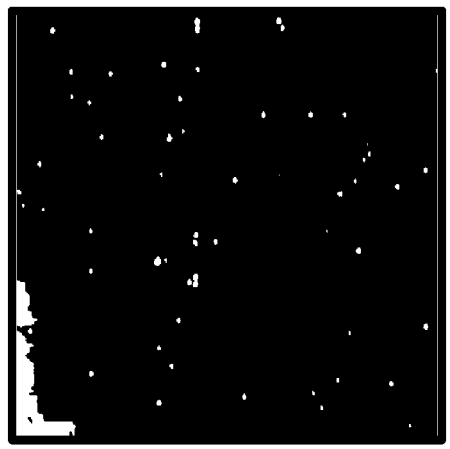
Figure 23D:
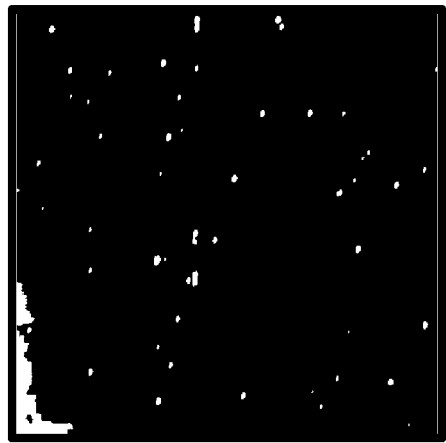

When it is determined that that the number of the dangling bond images of the SPM image within the image frame assigned the double tip status exceeds the predetermined threshold, such as the CNN output shown in FIG. 20, an automatic in-situ tip conditioning process is undertaken. In-situ tip reconditioning is done by applying voltage pulses between the tip and the sample or by a controlled indentation of the tip into the sample. This process most often needs to be repeated several times before obtaining the desired condition of the tip again. FIGS. 21A-21F show an example of autonomous tip reconditioning according to an embodiment of the present disclosure. FIG. 21A shows an initial SPM image within the image frame that is used to judge the quality of the tip based on the automated tip condition assessing process described above. The tip is automatically re-conditioned by a controlled indentation at the location of tip conditioning on the surface set by the user. FIGS. 21B-21E shown the sequence of images recorded automatically to judge the condition of the tip after each tip conditioning operation. Each image of FIGS. 21B-21E is taken after the controlled indentation at the location of tip conditioning set by the user. The majority vote outputs of the CNN is "1" (double tip) for all of the images in FIGS. 21B-21E, indicating that each round of the tip conditioning was not successful. As shown in FIG. 21F, after a successful tip conditioning, the majority vote output of the CNN becomes "0" (sharp tip) and the program stops its operation. FIG. 22 shows the outcome of dangling bond image analysis by the CNN of a conditioned tip having a sharp status as compared to the double tip SPM image.

Further embodiments of the present disclosure provide a SPM device that is further automated such that the samples are fed into the device for SPM analysis automatically, thereby further reducing the need for human intervention and observation.

The present invention is further detailed in the attached Appendix entitled "Autonomous Scanning Probe Microscopy in-situ Tip Conditioning through Machine Learning" totaling 4 pages; the contents of which are hereby incorporated by reference.

As a person skilled in the art will recognize from the previous detailed description and from the figures and claims, modifications and changes can be made to the preferred embodiments of the invention without departing from the scope of this invention defined in the following claims.

The invention claimed is:

1. A method for assessing the quality of a tip of a scanning probe microscope (SPM), said method comprising:
   recording an SPM image;
   extracting a plurality of images of dangling bonds from the SPM image;
   feeding the extracted images of dangling bonds into a convolution neural network one image at a time;
   analyzing each of the plurality of images of dangling bonds using the convolution neural network;
   assigning each of the plurality of images of dangling bonds one of a sharp tip status or a double tip status; and
   determining whether the number of the plurality of images of dangling bonds of the SPM image assigned the double tip status exceeds a predetermined threshold.

2. The method of claim 1 wherein the SPM image is recorded at a sample bias of −1.8 V.

3. The method of claim 1 wherein the SPM image is recorded at 50 pA.

4. The method of claim 1 wherein the plurality of images of dangling bond appear as bright protrusions in the SPM image recorded.

5. The method of claim 1 wherein each of the plurality of images of dangling bonds are 6×6 $nm^2$.

6. The method of claim 1 wherein the SPM image recorded is 100×100 $nm^2$.

7. The method of claim 1 wherein the SPM image recorded is of a hydrogen-terminated Si(100) surface.

8. The method of claim 1 wherein the convolution neural network includes a first convolution layer, a second convolution layer, a pooling layer, a densely connected layer, and an output layer.

9. The method of claim 1 wherein analyzing each of the plurality of images of dangling bonds includes pixelating each of the images of dangling bonds.

10. The method of claim 1 further comprising altering a user of the SPM when the number of the plurality of images of dangling bonds of the SPM image assigned the double tip status exceeds the predetermined threshold.

11. A method of automatically conditioning a tip of a scanning probe microscope (SPM) during imaging of a sample, said method comprising:
    setting an image frame and a location for tip conditioning;
    performing the method of claim 1 within the image frame on the sample;
    conditioning the tip when it is determined that the number of the plurality of images of dangling bonds of the SPM image within the image frame assigned the double tip status exceeds the predetermined threshold.

12. The method of claim 11 wherein assessing the quality of a tip of a scanning probe microscope (SPM) performed within the image frame on the sample until it is determined that the number of the plurality of images of dangling bonds of the SPM image within the image frame assigned the double tip status exceeds the predetermined threshold.

13. The method of claim 11 wherein the location for tip conditioning is a location where the tip is conditioned when it is determined that the number of the plurality of images of dangling bonds of the SPM image within the image frame assigned the double tip status exceeds the predetermined threshold.

14. A method of mass producing atomistic quantum dots, qubits, or particular atom orbital occupation comprising:
    selectively sensing or modifying the orbital occupation state of a given atom with an SPM;
    repeating the selectively sensing or modifying the orbital occupation state of a plurality of additional individual atoms with the SPM;
    performing the method of claim 1;
    repairing the SPM or replacing the SPM with a new SPM; and
    repeating the selectively sensing or modifying the orbital occupation state of a second plurality of additional individual atoms with the repaired SPM or the new SPM.

* * * * *